(12) United States Patent  (10) Patent No.: US 9,348,577 B2
Hoffman et al.                  (45) Date of Patent:     May 24, 2016

(54) MODULE UPDATING DEVICE (71) Applicant: Movimento Group, Plymouth, MI (US)

(72) Inventors: Benjamin J. Hoffman, Dexter, MI (US);
Dan Umbach, Brighton, MI (US);
Walter A. Dorfstatter, Northville, MI (US)

(73) Assignee: Movimento Group, Plymouth, MI (US)

( * ) Notice: Subject to any disclaimer, the term of this patent is extended or adjusted under 35 U.S.C. 154(b) by 0 days.

(21) Appl. No.: 14/458,828

(22) Filed: Aug. 13, 2014

(65) Prior Publication Data

US 2014/0351803 A1    Nov. 27, 2014

Related U.S. Application Data (63) Continuation of application No. 14/055,633, filed on Oct. 16, 2013, now Pat. No. 8,813,061.

(60) Provisional application No. 61/735,474, filed on Dec. 10, 2012, provisional application No. 61/715,045, filed on Oct. 17, 2012.

(51) Int. Cl.
G06F 9/45     (2006.01)
G06F 9/445    (2006.01)

(52) U.S. Cl.
CPC ........ *G06F 8/65* (2013.01); *Y02B 60/183* (2013.01)

(58) Field of Classification Search
None
See application file for complete search history.

(56) References Cited

U.S. PATENT DOCUMENTS

| | | | |
|---|---|---|---|
| 6,018,806 A | 1/2000 | Cortopassi et al. | |
| 6,126,327 A | 10/2000 | Bi et al. | |
| 6,188,602 B1 | 2/2001 | Alexander et al. | |
| 6,356,961 B1 | 3/2002 | Oprescu-Surcobe | |
| 6,836,657 B2 | 12/2004 | Ji et al. | |
| 6,947,554 B2 | 9/2005 | Freyman et al. | |
| 6,978,198 B2 | 12/2005 | Shi | |
| 7,007,049 B2 | 2/2006 | Peng | |
| 7,292,870 B2 | 11/2007 | Heredia et al. | |
| 7,350,205 B2 | 3/2008 | Ji | |
| 7,512,673 B2 * | 3/2009 | Miloushev | G06F 11/1076 717/172 |
| 7,516,450 B2 * | 4/2009 | Ogura | H04L 29/06 717/172 |
| 7,562,360 B2 | 7/2009 | Tai et al. | |

(Continued)

FOREIGN PATENT DOCUMENTS

EP    2381361    10/2011

OTHER PUBLICATIONS

Nilsson, Larson, "Conducting Forensic Investigations of Cyber Attacks on Automobile In-Vehicle Networks"; 2008 ICST; [retrieved on Mar. 20, 2016]; Retrieved from Internet <URL:http://dl.acm.org/citation.cfm?id=1363228>;pp. 1-6.*

(Continued)

*Primary Examiner* — Xi D Chen
(74) *Attorney, Agent, or Firm* — Great Lakes Intellectual Property, PLLC.

(57) ABSTRACT

An automobile, vehicle, vessel or other device may include a plurality of modules, software applications, computer program products, controllers or other logically executing entities to facilitate controlling, implementing or otherwise enabling various operations according to computer-readable instructions, code or other information stored within a memory, such as within a file or other memory construct. A controller having capabilities sufficient to facilitate updating, modifying, creating or otherwise manipulating such stored files and/or corresponding instructions is contemplated.

20 Claims, 5 Drawing Sheets

(56) References Cited

U.S. PATENT DOCUMENTS

| | | | |
|---|---|---|---|
| 7,587,433 | B2 | 9/2009 | Peleg et al. |
| 7,657,885 | B2* | 2/2010 | Anderson .................. G06F 8/65 717/169 |
| 7,665,081 | B1 | 2/2010 | Pavlyushchik |
| 7,681,192 | B2* | 3/2010 | Dietsch .................. G06Q 10/06 717/172 |
| 7,802,243 | B1 | 9/2010 | Feeser et al. |
| 7,805,720 | B2* | 9/2010 | Chang .................... G06F 9/445 717/173 |
| 8,010,959 | B2 | 8/2011 | Mullis et al. |
| 8,095,301 | B2* | 1/2012 | Kawamura ............. G01C 21/26 717/169 |
| 8,112,165 | B2* | 2/2012 | Meyer .................. G06F 9/4443 717/169 |
| 8,261,256 | B1* | 9/2012 | Adler .................... G06F 1/1626 717/173 |
| 8,266,612 | B2 | 9/2012 | Rathi et al. |
| 8,271,972 | B2 | 9/2012 | Braghiroli |
| 8,326,486 | B2 | 12/2012 | Moinzadeh et al. |
| 8,397,230 | B2 | 3/2013 | Ewington et al. |
| 8,468,243 | B2 | 6/2013 | Ogawa et al. |
| 8,516,142 | B2 | 8/2013 | Lee et al. |
| 8,612,153 | B2* | 12/2013 | Nomura .................. G01C 21/32 717/169 |
| 2004/0093196 | A1 | 5/2004 | Hawthorne et al. |
| 2005/0134710 | A1* | 6/2005 | Nomura ............... H04N 5/2251 348/240.99 |
| 2006/0242206 | A1* | 10/2006 | Brezak ............. G06F 17/30176 |
| 2007/0253261 | A1* | 11/2007 | Uchida ............. H04M 1/72527 365/189.05 |
| 2008/0001919 | A1* | 1/2008 | Pascucci .................. G06G 1/10 345/163 |
| 2008/0005733 | A1 | 1/2008 | Ramachandran et al. |
| 2009/0089775 | A1* | 4/2009 | Zusman .................... G06F 8/65 717/173 |
| 2010/0317401 | A1* | 12/2010 | Lee .................. G06F 17/30575 717/173 |
| 2011/0010699 | A1* | 1/2011 | Cooper .................. G06F 21/12 717/169 |
| 2011/0265075 | A1 | 10/2011 | Lee |
| 2012/0242167 | A1* | 9/2012 | Zeung .................. G06F 13/385 307/112 |
| 2013/0174050 | A1* | 7/2013 | Heinonen ............... H04L 67/32 715/748 |
| 2014/0013015 | A1* | 1/2014 | Chang .................... G06F 13/28 710/22 |
| 2014/0059534 | A1* | 2/2014 | Daum ...................... G06F 8/65 717/172 |
| 2014/0245285 | A1* | 8/2014 | Krenz ...................... G06F 8/65 717/173 |
| 2016/0041820 | A1* | 2/2016 | Ricci .................... H04W 48/04 717/172 |

OTHER PUBLICATIONS

Nilsson, Sun, Nakajima, "A Framework for Self-Verification of Firmware Updates over the Air in Vehicle ECUs"; 2008 IEEE; [retrieved on Mar. 20, 2016]; Retrieved from Internet <URL: http://ieeexplore.ieee.org/stamp/stamp.jsp?tp=&arnumber=4746641>;pp. 1-5.*

Steger, et al., "Applicability of IEEE 802.11s for Automotive Wireless Software Updates"; Telecommunications (ConTEL), 2015 13th International Conference on Year: 2015;[retrieved on Mar. 20, 2016>; Retrieved from Internet <URL:http://ieeexplore.ieee.org/stamp/stamp.jsp?tp=&arnumber=7231190>;pp. 1-8.*

Larson, Nilsson, "Securing Vehicles against Cyber Attacks"; 2008 ACM;retrieved on Mar. 20, 2016]; Retrieved from Internet <URL:http://dl.acm.org/citation.cfm?id=1413174>;pp. 1-3.*

* cited by examiner

MODULE UPDATING DEVICE

CROSS-REFERENCE TO RELATED APPLICATIONS

This application is a continuation of U.S. application Ser. No. 14/055,633, filed Oct. 16, 2013, now U.S. Pat. No. 8,813,061, which, in turn, claims the benefit of U.S. provisional Application No. 61/715,045, filed Oct. 17, 2012 and U.S. provisional Application No. 61/735,474, filed Dec. 10, 2012, the benefits and disclosures of which are incorporated in their entirety by reference herein.

TECHNICAL FIELD

The present invention relates to updating modules, devices, software applications or other logically executing constructs, such as but not necessarily limited to replacing and/or updating files included within a memory of the updated module to include a new file or new computer-readable instructions, code, data or other information sufficient to facilitate updating operations associated therewith.

BACKGROUND

The inventors of the present invention contemplate a potential exponential growth in the need to update, program, reflash, configure, calibrate or otherwise facilitate updating software, applications, instructions, files, code and other constructs when stored within memory of various modules, devices, etc., particularly for modules included within automobiles, vehicles, vessels, airplanes or other devices having relatively long operational lives that require such updates to be performed well after the manufacturing date. Part of the exponential growth is contemplated to result from more and more vehicles including modules, controllers or other features having software-based controls or other instruction dependent infrastructures where updates may be desirable for security breaches, bugs, defects or other coding issues arising or determined subsequent to the manufacturing date or deployment of the corresponding vehicle. While automobiles, for example, may be updated at a garage or a dealership having individuals with expertise with automobiles, requiring automobile owners to take their vehicle to such locals can be inconvenient. The inconvenience may lead to some owners simply avoiding the software update altogether, leaving a potentially problematic situation for continued operation of the vehicle as the update may be important to maintaining a proper operational state of the automobile.

One non-limiting aspect of the present invention contemplates facilitating software updates and other updates to automobiles and other vehicles without requiring the owners to take the vehicle to a dealership or a location having individuals with specialized expertise. One non-limiting aspect of the present invention envisions a controller, optionally physically attached to the updated device, having capabilities sufficient to facilitate performing updates automatically through wireless signaling, over the air (OTA) signaling or other communication means (wired connection). This capability may be advantageous, for example, in facilitating updates while a vehicle is within a home of the owner and/or enabling owners to perform updates themselves or in a manner where particular expertise may be unnecessary.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
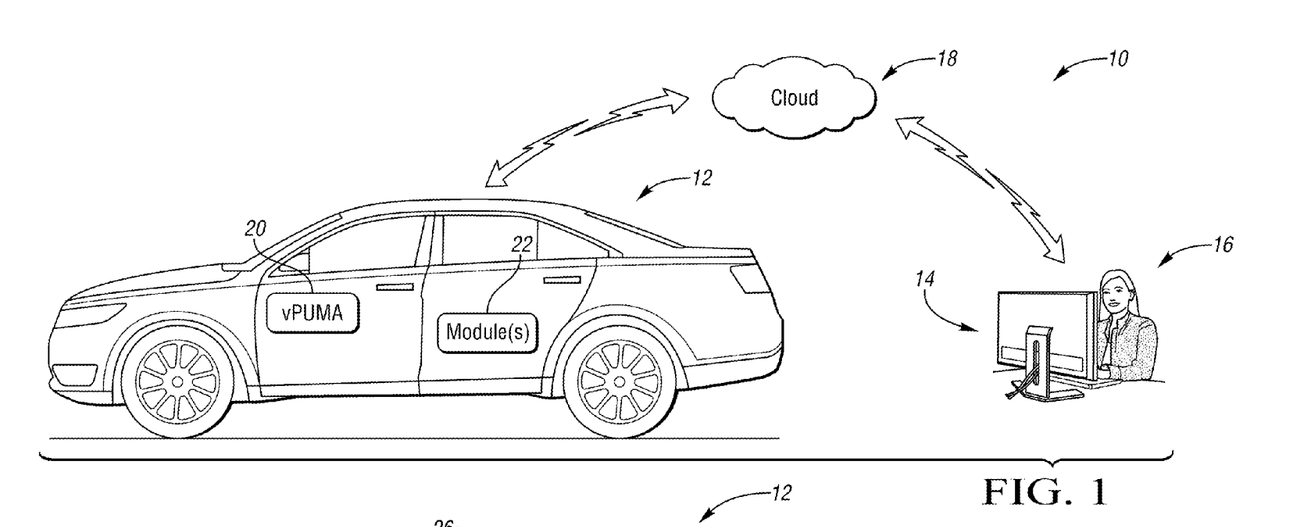
FIG. 1 illustrates an update system in accordance with one non-limiting aspect of the present invention.

FIG. 1 illustrates an update system 10 in accordance with one non-limiting aspect of the present invention. The system 10 is shown for exemplary non-limiting purposes with respect to facilitating over the air (OTA) updates for a vehicle 12 using one or more files provided from a server 14. A manager or other individual 16 associated with the server 14 may input the files needed for updating and the server 14 may communicate an appropriate one or more of files to the vehicle 12 by way of a network, cloud or other communication medium 18. Once delivered to the vehicle 12, a controller 20, labeled as vPuma, may be configured to process the files in a manner sufficient to facilitate updating one or more modules 22 included within the vehicle 12. In this manner, the present invention contemplates facilitating automatic updates of the vehicle modules 22 without requiring the vehicle owner to take the vehicle 12 to dealership or to possess any specialized expertise, at least with respect to performing software updates or otherwise having capabilities generally associated with a mechanic or other individual licensed to repair vehicles.

The present invention is predominately described with respect to facilitating updates for automobiles for exemplary non-limiting purposes as the present invention fully contemplates its use and application of facilitating updates for other types of vehicles, including but not necessary limited to vessels, airplanes, trains, trucks, etc., and/or non-vehicles, including but not necessary limited to industrial control systems, white goods and medical devices. The present invention is also predominantly described with respect to facilitating updates by replacing, modifying, re-flashing, re-configuring, re-calibrating or otherwise manipulating computer-readable instructions, software, code or other logically executing or logically controllable features of the module 22, which hereinafter referred to for exemplary non-limiting purposes as files, according to the files or other data provided from the server 14. The manager 16 may be an original equipment manufacturer (OEM) or other entity having capabilities sufficient to identify the files needed to facilitate updating those kept at the module 22. The files from the server 14 may be sufficient to update various controllable aspects or software-implementations executing or otherwise operating at the module 22, such as those related to vehicle operations associated with the modules 22.

In the case of the vehicle 12 being an automobile, the vehicle 12 may include any number of modules 22 configured to support, direct, implement, perform or otherwise engage various vehicle operations. The vehicle 12, for example, may include modules for: a powertrain (engine, transmission, hybrid/electric drive), HVAC (heating/cooling), driver information (vehicle speed, vehicle performance characteristics), BCM (general body controls such as lighting, door locks and more), chassis control/braking (electrical control of all braking and stability control systems), airbag/safety (control of airbag deployment and other active safety systems), infotainment (all aspects of in-vehicle audio, video, navigation and graphical user interface), etc. These modules 22 may be originally manufactured with files sufficient to direct their operation and thereafter updated with new files having computer-readable instructions different in content and/or form using the controller 20 contemplated by the present invention.

The processes performed by the controller 20 may rely upon wireless signaling with the server 14 to facilitate transmitting the files associated with updating those already resident on the modules 22 and/or providing new files for later added modules or modules not already having an initial file set. The use of wireless signaling is believed to be particularly advantageous in allowing files to be delivered to the controller 20 virtually anywhere, including at a home of the vehicle owner. The wireless signaling may correspond with any type of wireless signaling, including but not limited to cellular signaling, Wi-Fi signaling, Internet Protocol (IP) signaling, satellite signaling, Bluetooth signaling, etc. While the use of wireless signaling is contemplated, the present invention fully contemplates using wired or wireline signaling to support file transport, such as between the server 14 and the controller 20 and/or an intermediary between the server 14 and the controller 20, e.g., an adapter, a charging station, a wall outlet or other direct connection available between the vehicle 12 and home or other location where the vehicle 12 may be typically stored or taken for updating. Optionally, wired and/or wireless signaling may be used between the controller 20 and the modules 22 to further facilitate transporting the files and/or instructions necessary to achieving the contemplated module updates, including communications carried out over a Controller Area Network (CAN), network or other bus included within the vehicle 12.

Figure 2:
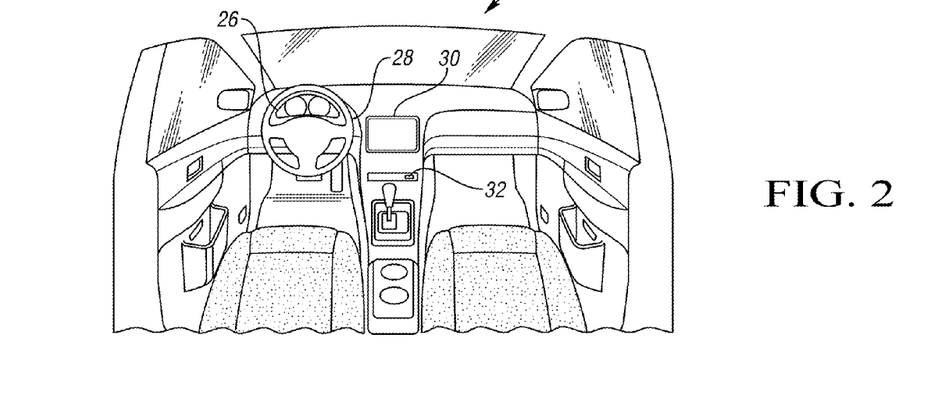
FIG. 2 illustrates a partial view of an interior of the vehicle in accordance with one non-limiting aspect of the present invention.

FIG. 2 illustrates a partial view of an interior of the vehicle 12 in accordance with one non-limiting aspect of the present invention. The vehicle 12 may include a dashboard 26 having instruments related to various vehicle operations, a steering wheel 28 for directing vehicle travel, a human-machine interface (HMI) 30, such as but not necessarily limited to a touchscreen, for displaying information to and receiving inputs from a vehicle occupant, a Universal Serial Bus (USB) port (exterior port) 32 for interconnecting devices with the vehicle 12 and/or vehicle bus, and/or any number of other devices, interfaces, etc. Each of the illustrated vehicle components may operate in cooperation with one or more of the vehicle modules 22 in order to facilitate the operations associated therewith. An electronic control module (ECM) or other suitable module (not individually shown) may be tasked with controlling, managing or otherwise overseeing operations of the various modules and/or components within the vehicle, including providing control or other oversight for the various communications that may take place between the modules 22 and/or over the vehicle bus(es). The controller 20 may be operable with the illustrated and non-illustrated modules 22 in order to facilitate the operations contemplated herein, including facilitating displaying information and receiving user inputs in response thereto by way of the HMI 30 and/or other communicative features of the vehicle (voice recognition, microphone, connected phone/tablet/computer, steering wheel controls, Bluetooth connection, etc.) 12.

Figure 3:
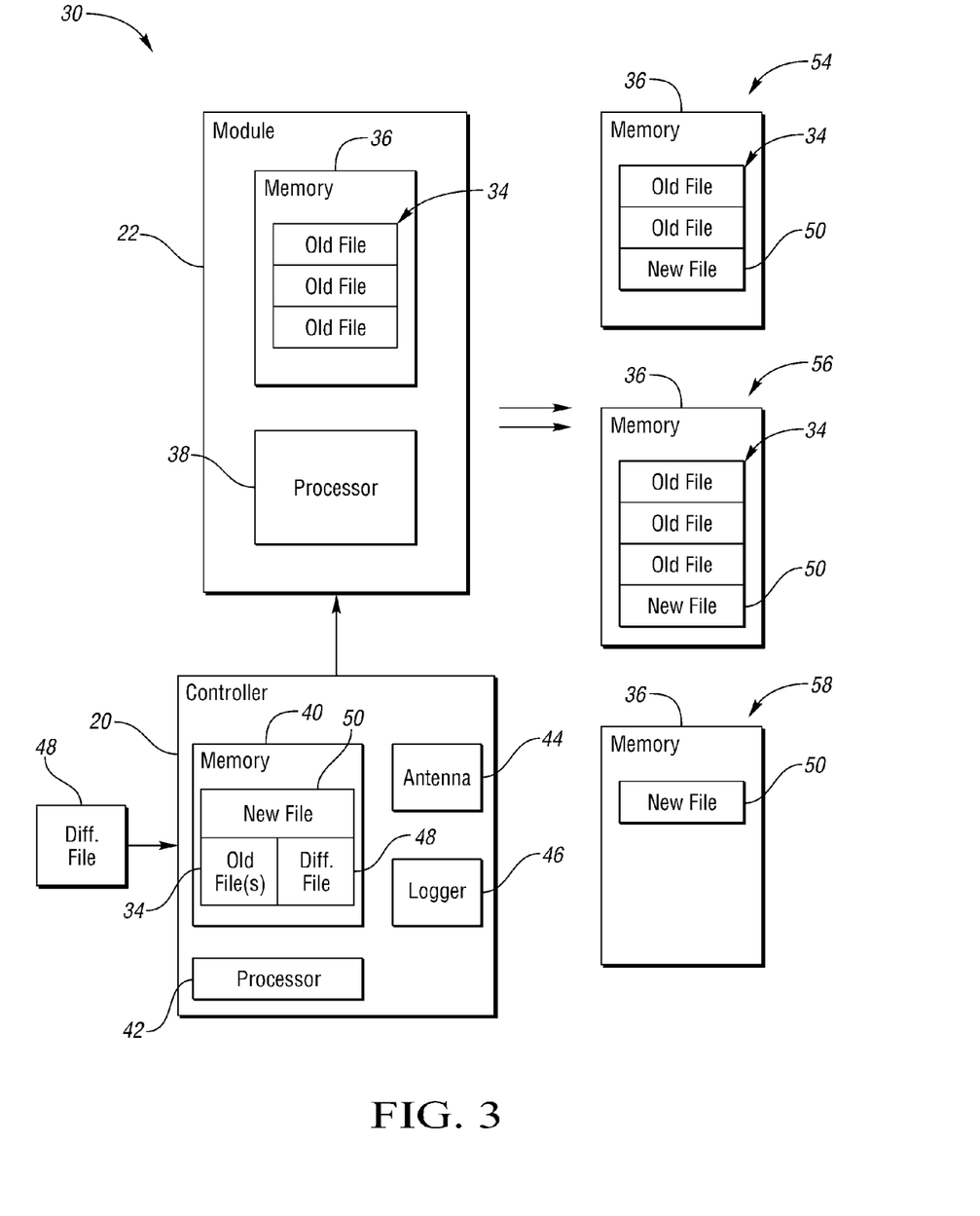
FIG. 3 schematically illustrates a representation of a module update performed in accordance with one non-limiting aspect of the present invention.

FIG. 3 schematically illustrates a representation 30 of a module update performed in accordance with one non-limiting aspect of the present invention. The update may correspond with the controller providing instructions sufficient for updating one or more old files 34 stored within a memory 36 of the module 22. The module 22 may include a processor 38 or other features necessary to facilitate the operations contemplated herein, such as but not necessary limited to a network interface or other element sufficient to facilitate communications with the controller 20, i.e., signaling associated with wired and/or wireless signaling. The controller 20 may include a memory 40, a processor 42, an antenna 44 or other network interface, a logger 46 and/or other features necessary to facilitate operations contemplated herein. The controller 20 may be configured to receive a difference file 48, an update file or other file from the server 14 for storage within the memory 40. The memory 40 may include computer-readable instructions operable with the processor to facilitate processing the difference file 48 stored within the memory 40 and thereafter generating a new file 50 for use in facilitating update of the module memory 36. The controller 20 may be configured to generate the new file 50 based on the one or more old files 34 being updated, such as by merging the difference file 48 with the old file 34 to generate the new file 50.

The new file 50 may include a plurality of computer-readable instructions, code or other executable constructs sufficient for directing or otherwise controlling operations of the module desired for updating. The computer-readable instructions of the new file 50 may be based upon computer-readable instructions associated with the difference file 48 and/or the old file 34. The computer-readable instructions of the new file 50 may, for example, corresponding with the computer-readable instructions of the old file 34 except for those intended to be replaced with corresponding computer-readable instructions included within the difference file 48. In particular, one non-limiting aspect of the present invention contemplates downloading a smaller file to the controller 20 than the old file 34 being replaced on the module 22, i.e., the portions of the old file 34 needing updating or other changes may be downloaded instead of requiring the entire file to be downloaded, which may be particularly beneficial if the old file 34 consumes relative large amounts of valuable memory and/or is time-consuming to download. While use of the difference file 48, i.e., a file containing only the differences between the old file 34 and the new computer-readable instructions, is contemplated, the present invention is not necessary so limited and fully contemplates downloading any size file, including an entire replication of the old file 34 with the necessary updates already included therein.

The antenna 44 may be used to facilitate wirelessly downloading the difference file 48 to the controller memory 40. The controller 20 may be configured to facilitate updating or otherwise tracking various versions of the files included within any number of modules 22 of the vehicle 12. The logger 46 may be configured to keep track of the files, versions of the files or other representations (identifications, revisions, etc.) of the files in order to track the currently installed files and/or facilitate identifying whether such files require updates. The controller 20, for example, may be configured to retrieve the identifying information by the logger 46 and to communicate this information to the server 14 in order to query the server 14 or to otherwise facilitate identifying whether one or more of the modules 22 require one or more of the old files 34 to be updated, i.e., the server 14 can compare the information provided by the logger 46 to determine whether an update is desirable. In the event an update is desirable, the server 14 can provide corresponding instructions and/or the necessary files to the controller 20 to facilitate the desired update. The controller 20 may be configured to automatically perform the updates at a suitable period of time and/or to provide messages or other instructions to the vehicle occupant to initiate an update.

As shown in a right-hand portion, the module memory 36, or more particularly the old files 34, may updated differently depending on the nature of the update. A first update 54 is shown to correspond with the new file 50 provided from the controller 20 being stored within the module memory 36 in place of one of the old files 34, i.e., one of the old files 34 is deleted and replaced with the new file 50. Instructions may be provided from the controller 20 to facilitate replacing the old file 34 and/or the module 20 may include a boot loader or other application sufficient to facilitate the update upon receipt of the new file 50. A second update 56 shown to correspond with the new file 50 being added to the module memory 36 in addition to the old files 34 already stored thereon. A third update 58 is shown to correspond with the new file 50 being used in place of multiple old files 34 previously stored on the module memory 36. The illustrated updates are merely exemplary of various updates that may be performed in accordance with the present invention and are not intended to necessarily limit the scope of contemplation of the present invention. The type of updates and/or the portions of the memory 36 replaced and/or modified according to the new file 50 may vary depending on the configuration of the new file 50. Optionally, rather than merging the difference file 48 with the old file 34 at the controller 20, the module 22 may be configured to perform the merging and/or other operations sufficient to eliminate the need for the controller 20 to completely generate a new file 50, e.g., the controller 20 may be configured to simply pass the difference file 48, an entire file or other update file to the module 22 for updating the corresponding portion of the module memory 36.

The update described with respect to FIG. 3 may be achieved with the controller 20 being a standalone component included within the vehicle 12 either during manufacture or after its manufacture, e.g., the controller 20 may be included as part of a wiring harness if intended to communicate through wired communications with the modules 22 being updated and/or the controller 20 may be a wireless device physically attached to the vehicle 12 and/or positioned in proximity thereto when intended to communicate through wireless communications with the modules 22. The FIG. 3 representation 30 may be characterized as a network-based implementation at least in that the controller 20 may be commonly connected to a vehicle bus or other vehicle-based infrastructure as a node or other device having communication rights and capabilities similar to those possessed by the vehicle modules 22, i.e., the controller may be required to follow communication protocols, prioritization processes and other operations required to facilitate network-based communications within the vehicle 12. Optionally, the controller 20 may be configured to secure update related transmissions, including the new file 50, using transport layer security (TLS) tunnels and the like. The modules 22 may not need to be adjusted or otherwise re-configured to communicate with the controller 20 or to connect thereto, i.e., the modules 22 may simply continue to operate according to normal messaging procedures associated with identifying message being carried over the vehicle bus that are intended for their receipt and processing.

Figure 4:
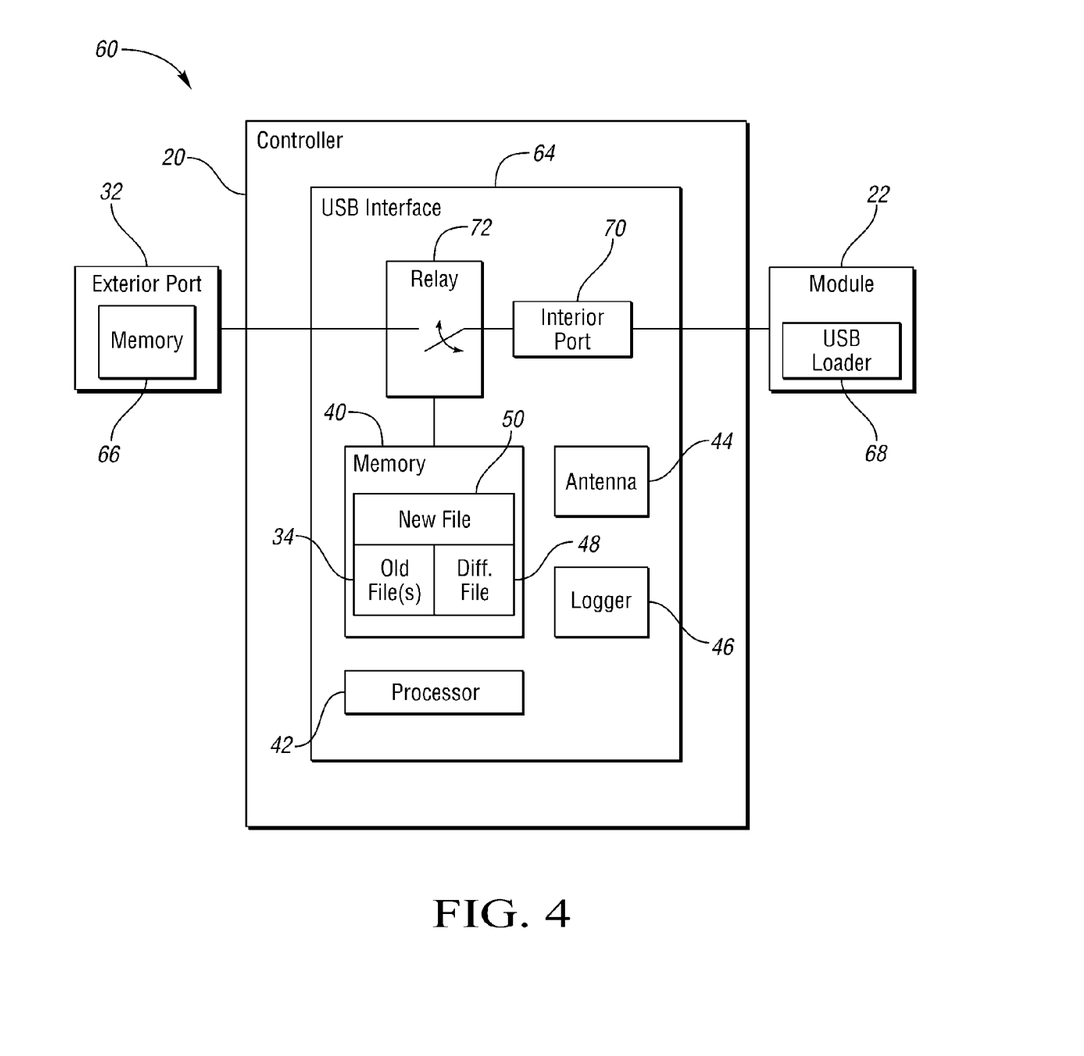
FIG. 4 schematically illustrates a representation of a module update performed in accordance with one non-limiting aspect of the present invention.

FIG. 4 schematically illustrates a representation 60 of a module update performed in accordance with one non-limiting aspect of the present invention. The update may correspond with the controller 20 having a USB interface 64 sufficient to facilitate interconnecting the module 22 and the exterior port 32 of the vehicle 12. The exterior port 32 may be configured with as a USB interface sufficient to receive a thumb drive, a USB connection, etc. through which a memory 66 of the connected device may be accessible according to USB protocols and messaging requirements. The USB connection, for example, may correspond with that specified within USB specifications 1.1, 2.0 and/or 3.0, the disclosures of which are hereby incorporated by reference in their entireties. The use of USB related communications is particularly contemplated in order to utilize existing capabilities of a commonly employed technology that may be already installed on one or more of the modules 22 in the form of a USB loader 68. The USB loader 68 may be configured to facilitate accessing the memory 66 associated with the exterior port 32 according to USB specified operations, including processing files or other data included within the memory 66, e.g., a music file included on a thumb drive or a mobile phone may be communicated to the module 22 by way of the exterior port 32 to facilitate playback through an entertainment system of the vehicle 12.

The controller 20 shown in FIG. 4 may be similarly configured to the controller 20 shown in FIG. 3 insofar as including the memory 40, processor 42, antenna 44 and logger 46 and having capabilities sufficient to facilitate storing a difference file 48 from the server 14, copying the old files 34 from the to be updated module 22 and generating a new file 50 for subsequent communication to the module 22 for replacement of old file 34 stored thereon. The USB interface 64 may be included to provide an internal port 70 connectable between the module 22 and a relay 72 to facilitate hardwiring or otherwise controlling a connection between the USB loader 68 and one of the exterior memory 66 and the controller memory 40. The relay 72 may be operable between a first position and a second position according to instructions received from the processor 42 or otherwise generated with the controller 20 or other device in the vehicle 12. The first position may correspond with the relay interconnecting the exterior memory 66 with the USB loader 68 such that the controller memory 40 is bypassed and/or the module 22 is disconnected from the controller memory 40. The second position may correspond with the relay 72 interconnecting the controller memory 40 with the USB loader 68 such that the exterior memory 66 is bypassed and/or disconnected from the USB loader 68. In this manner, the controller 20 may selectively control whether modules 22 are able to communicate with the exterior memory 66 or the controller memory 40.

The ability to selectively control the memory 40, 66 connected to the USB loader 68 may be particularly beneficial in accordance with one non-limiting aspect of the present invention to facilitate updating files stored within the module 22 using the USB-based capabilities of the USB loader 68. In particular, the USB loader 68 may be configured to automatically read/write data, files or other information from the connected-to memory 40, 66 according to resident USB operating capabilities. The USB loader 68 may be configured to identify, process or otherwise review the files of the connected-to one of the exterior memory 66 and the controller memory 40 to ascertain whether any corresponding files should be incorporated for various vehicle operations and/or for use in facilitating the file updates contemplated by the present invention. In response to determining a need to update one of the old files included on the module 22 having USB loader 68, the controller 20 may be configured to automatically actuate the relay 72 from the first position to the second position in order to force the USB loader 68 to recognize the new file 50 stored in the controller memory 40. Once the new file(s) 50 are recognized, the USB loader 68 may automatically perform an update of the file stored within its memory 36 in order to achieve the desired update, i.e., one or more of the old files 34 may be replaced or otherwise updated in light of the new file 50 provided from the controller memory 40.

When controlled to the second position, the relay 72 may prevent the module 22 from communicating with the exterior memory 66 or other device connected to the exterior port 32. This temporary disablement of the capabilities associated with the exterior port 32 may be offset by the benefit of enabling the controller 20 to automatically update the module 22 without requiring the module 22 to include software or other application program interfaces (APIs) required to receive instructions from the controller 20 regarding the desired update. The update process illustrated within FIG. 3 requires the controller 20 provide update instructions or other information to the module 22 in order to inform the module 22 of the new file 50 and/or to undertake other operations necessary to replace an old file 34 with the new file 50 provided from the controller 20. In contrast, that the process illustrated with an FIG. 4 eliminates a need for the controller 20 to provide such information to the module 22 as the USB loader 68 includes capabilities sufficient to automatically identify when the new file 50 is available within the controller memory 40 and to retrieve that new file 50 in a manner sufficient to facilitate the contemplated updates. Optionally, the USB loader 68 may be configured to request permission or to otherwise receive an authorization before undertaking operations associated with files retrieved from the exterior memory 66 and/or the controller memory 40.

The USB loader 68 or other feature of the module 22 and/or another module within the vehicle 12, e.g., the ECM, may be configured to command the HMI 30 to display information to the vehicle occupant associated with obtaining the permission required by the USB loader 68 to act on any retrieved files. One non-limiting aspect of the present invention contemplates relying upon this capability of the USB loader 68 in order to notify a vehicle occupant that an update is available. An update available message may be displayed through the HMI 30 and a corresponding input may be received therethrough in order to authorize the USB loader 68 to retrieve the new file 50 from the controller memory 40 and/or to implement the new file 50 if already retrieved from the controller memory 40. In this manner, one non-limiting aspect of the present invention contemplates the controller 20 initially identifying a need to update the module 22 and subsequently controlling the relay 72 to the second position in order to prompt the USB loader 68 to retrieve the new file 50 from the controller memory 40. The USB loader 68 may be autonomously engaged following movement of the relay 72 to control the HMI 30 in a manner sufficient to obtain the update permission or update command from a vehicle occupant needed for the USB loader 68 to act on the new file.

Figure 5:
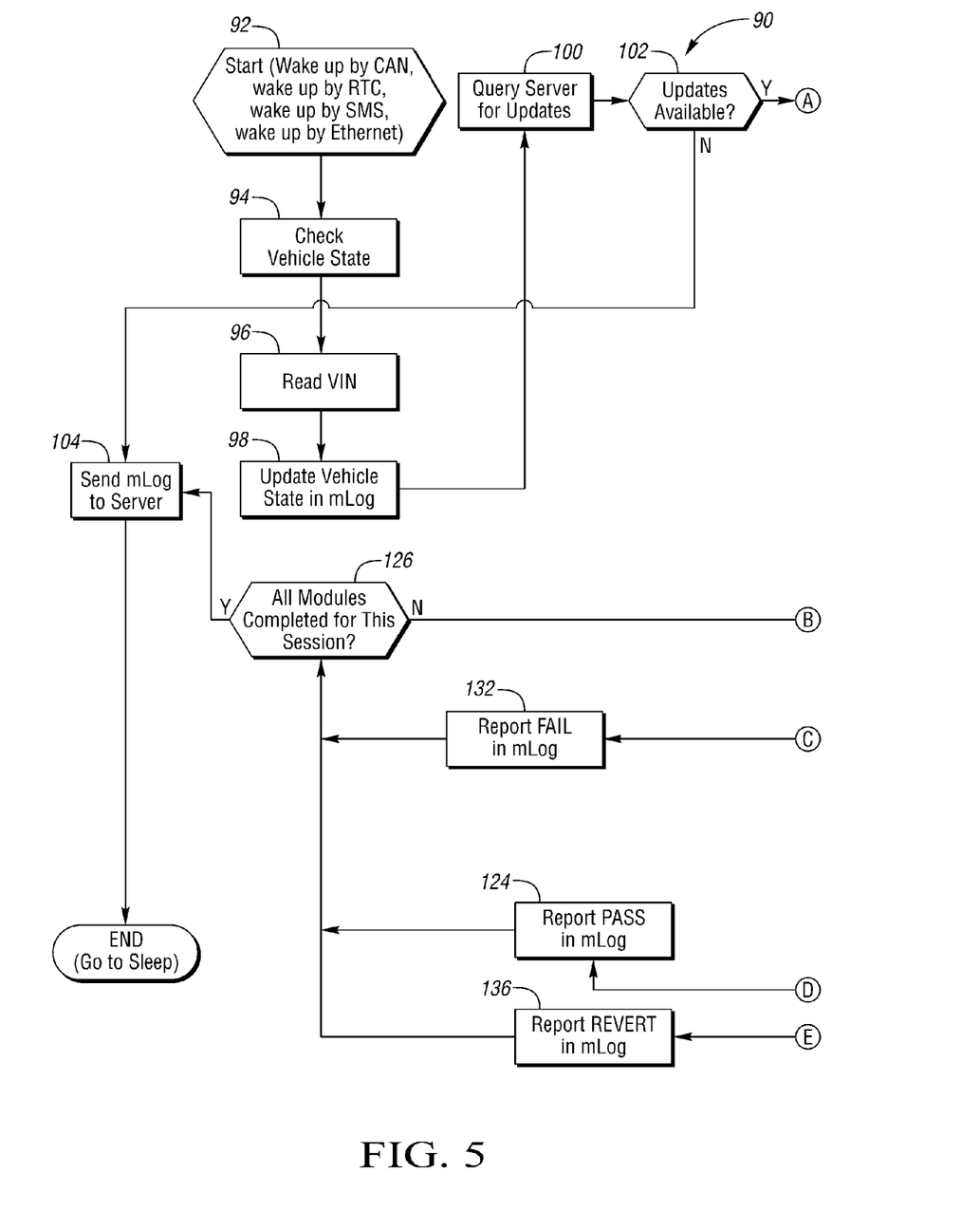
FIG. 5 illustrates a flowchart for module update method in accordance with one non-limiting aspect of the present invention.

FIG. 5 illustrates a flowchart 90 for a module update method in accordance with one non-limiting aspect of the present invention. The flowchart 90 indicates various operations associated with updating a module (e.g. module 22) included on a vehicle or other device as a function of files provided from a controller (e.g. controller 20). The corresponding processes, operations, etc. may be performed in the illustrated sequence and/or according to another sequence, optionally with one or more of the processes being omitted or other processes being added. The method may be embodied in non-transitory computer-readable medium or computer-program product of the controller, server, module and/or other feature, having computer-readable instructions, operable with a processor or other element, sufficient to facilitate controlling the controller, server, etc. to achieve or otherwise undertake the operations contemplated herein. The method is predominately described with respect to updating a module included on a vehicle for exemplary non-limiting purposes and without necessarily intending to limit the scooped and contemplation of the present invention as similar operations may be performed to facilitate updating other devices.

Block 92 relates to awakening the controller from a sleep mode, low power mode or other operational state where the controller would otherwise be inoperable to facilitate updating the module. The controller may be awoken by various means, such as but not necessarily limited to: engagement of a ignition key, a wake-up signal/message received of the CAN, a real-time communication (RTC) message, short message service (SMS) message, connection of Ethernet cable (e.g., Ethernet connection of controller to the vehicle) and/or as a function of other signals or messaging that may be communicated through the antenna and/or through a local network interface of the controller. Once awoken, the controller may perform diagnostics or other operations to assess its operational readiness, integrity and/or security, and if passed, begin the contemplate process for automatically checking whether updates are available for one or more modules in the vehicle and/or whether any modules in the vehicle are authorized to be updated with the controller. Optionally, the controller may be configured to assess the operation state of the vehicle prior to undertaking update related operations in order to insure sufficient resources are available to complete the update.

Block 94 relates to determining an operational state of the vehicle reflective of its capabilities to facilitate updating the module. The operational state may be determined to be one or more of a plurality of operational states, which for exemplary purposes are described to be one of a first state and a second state. The first state may correspond with one or more vehicle operating parameters indicating conditions are suitable to updating the module and the second state may correspond with one or more vehicle operating parameters indicating conditions are unsuitable to updating the module. Various conditions may be analyzed to determine whether the vehicle is in first or second state, including a capacity of a vehicle battery to provide the power or energy needed to operate the controller, module and/or other vehicle components for a period of time sufficient to start and finish the update without a loss of power. The vehicle battery being assessed may correspond with an accessory battery, starting battery or low voltage battery included within the vehicle to power the controller, module and/or other vehicle components. The assessed vehicle battery may be differentiated from a high voltage battery included in with a hybrid electric vehicle (HEV) or electric vehicle (EV) if such a high voltage battery is unable to facilitate powering the components needed to perform the update, otherwise the high voltage battery may also be assessed.

The capacity, state of charge (SOC), voltage and/or other parameters of the assessed battery may be monitored with a battery monitoring system (BMS) or other device. The controller may include an algorithm for calculating whether the assessed battery can supply the power needed to perform the update based on the capacity of the battery, amount of time needed to perform the update, the amount of power needed for the components involved in performing the update and/or the power consumption of other vehicle components and system that may need to be operational during the update period. Optionally, the energy may be estimated instead using a constant or estimated power consumption value representative of energy consumed per unit time such that the capacity of the assessed battery to power the necessary devices during the update can be calculated based on an amount time needed to perform the update. The amount of time needed to perform the update may be calculated based on a number of time periods, such as first time period associated with an amount time needed for the controller to communicate with the server, and if necessary, download the difference file or other update file, a second time period associated with an amount of time needed for the controller to generate the new file, a third time associated with the amount of time need to communicate the new file from the controller to the module being update (data rate) and/or a fourth time period associated with an amount of time needed for the module to replace the old file with the new file (may vary depending on whether vehicle occupant interaction is required, e.g., more time may be estimated if the USB loader obtains a permission by way of the HMI).

Block 94 relates to assessing the readiness of the vehicle to perform the update and is described predominately with respect to assessing power/energy levels needed to power the components associated with the update for a period of time sufficient to insure the update is fully completed. The ability to make such an assessment may be important as errors may occur during corresponding read/write operations if operations are unable to complete due to insufficient power. Optionally, other factors may be considered when determining the readiness of the vehicle, i.e., whether the vehicle is in the first state or the second state. One such factor may be a security setting related to a lock-down state or user-engaged control of the vehicle where security measures may be manual implemented to prevent updates. One non-limiting aspect of the present invention contemplates engaging a security measure to prevent unwanted attacks or hacks of the vehicle systems, modules, and components by preventing updates to vehicle software, code, instructions, etc. When such a measure is detected, the vehicle operation state may be automatically determined to be the second state in order to prevent updating the module and/or to limit the modules that may be updated to those specifically identified by the user as being acceptable for updates, which may be beneficial in thwarting unwanted cyber attacks.

Block 96 relates to reading a vehicle identification number (VIN) or other marking sufficient to uniquely identify the vehicle in the event Block 94 determines the first vehicle state. The VIN determination may be a precursor to beginning the module update where the vehicle is uniquely identified for the purposes of identifying software versions, updating requirements and other parameters relating to the particular features of the vehicle that may require updating in accordance with the present invention. The controller may be programmed with the VIN and/or it may include a processor for identifying the VIN once connected to the vehicle, e.g., when connected physical as part of a wiring harness or when wireless connected using a wireless link. The controller may identify the VIN may transmitting a VIN query over the vehicle bus, reading data stored on other modules and/or obtaining identifiers from vehicle specific components, such as amplifiers used in certain vehicle circuitry. The VIN may be a series of alphanumeric numbers, a piece of metadata or other construct sufficient for uniquely identifying the vehicle. Optionally, the controller may communicate with the user by way of the HMI to identify the vehicle, such as through a vehicle selection menu where the year, make and/or model of the vehicle may be selected and/or through a personal identification sequence where the user inputs a username and password or other identifying information that may be cross-referenced to associated information for the vehicle.

Block 98 relates to assessing a vehicle log kept by the logger of the controller. The vehicle log may be a database or look-up table where configurations, versions, operation systems and other information regarding the software settings of each updatable module in the vehicle may be tracked. The controller may be configured to generate the log as function of the VIN, such as by querying the server to identify updatable modules, and thereafter checking with the modules for the current state of the software and/or identifying previously made updates. The log may provide a software diagnostics tool sufficient to keep track of any number of settings for the various modules independently of information kept with the ECM or the modules themselves. The log may provide a back-up system and manifest usable in accordance with the present invention to facilitate generating reports regarding software parameters for the vehicle modules, including information regarding on-going updates performed with the controller. The information kept in the log may be transmittable from the controller to the server and/or a third party for use in performing various inquires. The log may keep state information for each module, such as a current state and an ending state where the current state identifies the current software version and the ending state identifies the version that is desirable for the module, i.e., the work that needs to be done in order to update the module to the desired software version.

Block 100 relates to querying the server with the VIN and/or state information kept within the log to determine whether any of the modules may require an update. The controller may be configured to automatically and autonomously query the server of the updates on a periodic basis, which may be user selectable, and/or anytime the vehicle operating conditions indicate an ability to perform module updates. Optionally, if the size of the files associated with the update are unknown before querying the server, the controller may verify sufficient capacity of the battery to perform the query before proceeding and without considering the amount of time required to download the files and undertake the other operations associated with updating the modules. The time associated with these other operations may be continually assessed with the controller to determine whether the update operations contemplated herein should continue, i.e., that the vehicle is likely to remain in the first state given any time constraints associated with newly discovered information (the time constraints may increase/decrease depending on information provided from the server regarding the size of the file to be updated). The controller may be configured to make a final timing assessment just before instructing the module to read/write date to memory in order to insure sufficient power is available to complete the update.

Block 102 relates to the controller receiving a response message from the server indicating whether any updates are available. If no updates are available, Block 104 relates to transmitting a log message to a logging server, which may be independent of the server providing the files for update, regarding information included within the log. The log message may identify the update being performed and that no additional updates are required for the updatable modules listed within the log of the controller. The log message may be used by the logging server to facilitate generating reports and otherwise reporting diagnostics information or providing a manifest regarding the operational state of the various modules included within the vehicle or other devices being assessed with the controller. If updates are available, Block 106 relates to identifying the desired update and assessing whether the controller includes a backup or a copy of the file requiring update, which is illustrated in the figures above as an old file. The old file may be stored at the controller and include the same plurality of computer-readable instructions as that included within the corresponding files stored within the module to be updated. The controller may determine whether the backup copy is available based on information included within the response transmitted from the server, i.e., the server may identify the old file kept on the module, and/or the logger me keep track of the old files for the purposes of identifying whether the controller already includes a copy of it.

Block 108 relates to determining that the old file requiring updating has not been stored or is not otherwise available within the controller memory and thereafter performing an assessment of whether the old file can be obtained, such as by the controller querying the module and/or querying the ECM or other entity keeping additional copies of the old file. Block 110 relates to determining that a copy of the old file is available and retrieving the old file for storage within the controller memory. The storage of a backup copy or an entire copy of the old file being replaced on the module may be beneficial in enabling a recovery operation where the old file can be provided back to an updating module in the event the update fails or the module fails to operate properly following the update. Additionally, storage of the old file may be useful in limiting the amount of data being downloaded from the server to correspond with a difference file, i.e., the difference between the new file and the old file. Blocks 112, 114 relate to downloading a difference file to the controller memory and the controller thereafter merging the difference file with the old file to generate the new file such that the new file becomes the file intended by the server to replace the old file on the memory of the module being updated. The server may include instructions with the difference file to facilitate the merging and/or the controller may include an application having capabilities sufficient to perform manipulations of the old file necessary to generate the new file in light of the computer-readable instructions or other information included with the difference file.

Block 116 relates to determining that a copy of the old file or the entire old file is not available from sources within the vehicle and requesting the server to provide an entire version of the updating new file for storage in the controller memory. The size of the new file provided from the server may be larger than the difference file being provided when the back-up copy of the old file is available. The difference file may be used in order to limit the download time in an effort to conserver bandwidth and/or the amount of energy needed from the vehicle to support the download, which may be preferred in some situations but its use is not intended to limit the scope and contemplation of the present invention as the updating process may be sufficiently achieved when "entire" files are downloaded from the server for processing with the controller. The use of the controller to update entire files may be particularly useful when the module is being updated for the first time or when modules are added to vehicle after manufacture as both situations may prevent delivery of a back-up copy to the controller. Optionally, the controller or the logger may initially save the old file and keep track of multiple difference file updates that occur over time in order to eliminate the need to continuously query for the back-up copy.

Block 118 relates to assessing whether all the files for a particular session have been downloaded to the controller and/or whether the controller has created all of the new files associated with the current session or module update. One non-limiting aspect of the present invention contemplates the controller being configured to simultaneously update multiple, different modules and/or to update a single module with multiple, new files, both of which may require multiple files to be download and prepared for transmission to the same or different modules proximate a common period of time. The controller may include an algorithm for calculating the most efficient manner for updating multiple modules/files depending on in-vehicle bandwidth, whether multiple modules can be communicated with at the same time, whether the same module can simultaneously process multiple files, etc. The session or update period may vary depending on the number of files being updated and the rights and/or capabilities of the controller to utilize in-vehicle network resources and/or to update certain modules given a current operational state of the vehicle (e.g., some modules may be not updatable for safety reasons while the vehicle is running or being charged (hybrid or electric vehicle) and/or some modules may not be updatable when in use, i.e., a download process may start when a certain module is idle or asleep and then terminate before commencing read/write actions if the module is subsequently awoken or otherwise engaged for its normal usage).

Block 120 relates to performing the read/write and/or other operations associated with replacing the one or more old files with the corresponding one or more new files for the one or more modules being updated. The update may be performed by the module(s) deleting the old file and writing the new file and/or in some other operation that achieves the same result, e.g., by merging the difference file with the old file at the module instead of at the controller. The controller may transmit the new file and/or instructions to the module being updated to facilitate replacing the old file. The update may occur, as noted in FIG. 3, with the controller transmitting the new file and corresponding instructions to the module, and as noted in FIG. 4, without the controller transmitting instructions to the module and instead relying on capabilities of the module to obtain the new file on its own from a memory (this process my include additional instructions being generate to actuate the relay and/or to interact with a vehicle occupant using the HMI). Of course, the present invention is not necessarily so limited and fully contemplates other interactions taking place in order to facilitate delivering the new file to the module for updating, including relying on signaling and/or messaging being communicated from the ECM or other module in the vehicle having oversight or authority sufficient to control the module to perform the desire update. Optionally, modules having capabilities to perform their own wireless signaling or to perform other signaling related operations may be instruction to obtain permission for the update from entities outside of the vehicle, such as a third party authorization entity or a trusted authentication authority.

Block 122 relates to assessing whether the module updated properly. The assessment may be performed by the controller transmitting test signals to the module and/or monitoring module operations for compliance with normal or pre-defined operation settings. Optionally, the module may be instructed to transmit a completion message or other information sufficient to determine whether the update was successful or unsuccessful. Block 124 relates to the controller and/or module generating a pass message indicating a successful update and the logger making a corresponding update to the log indicative of the same. This logging function may be beneficial in tracking the software version currently executing on the module for use in generating reports and identifying a need to perform subsequent updates. Block 126 relates to assessing whether any additional updates were to be performed, i.e., after an initial file update or an initial, simultaneous processing of multiple file updates. If the update was unsuccessful, such as in response to the module updating improperly thereafter and/or the update failing to complete, Block 128 may be reached and an assessment is made as to whether the back-up or copy of the old file is available for re-use. Block 130 relates to re-installing the old file if the old file is available and Block 132 relates to generating a fail message for entry in the log if the old file is not available or the module cannot otherwise return to a proper operational state. Block 134 assess whether the re-install was successful, and if so, Block 136 corresponds with generating a revert message for updating the log to identify the current state of the software.

As supported above, one non-limiting aspect of the present invention relates to enabling robust, secure and efficient software updates with limited or no changes required to existing OEM modules and software, optionally with or without difference files using wired or wireless vehicle connectivity. Implementing a difference file strategy may provide an efficiency gain (for applicable modules/file size) for OEMs to improve the automotive software update process. The difference file strategy means that when updating software only the change needs to be sent to the vehicle, not the entire file. The update file size efficiency saving is dependent on module hardware and software architectures and the extent of the needed changes. One benefit of sending only the difference files is realized from the OEM software update system all the way through to each individual vehicle. The difference file engine may be managed by the off-board systems and the controller, enabling a dramatic and valuable shift in the way OEM's execute in-vehicle software updates. Difference (or "dif") files may be configured in accordance with the present invention may be used to allow for only the portion of the software that changed be sent to the vehicle, reducing file transmission size and download time in comparison to pre-flashing otherwise replacing the entire software/firmware of the module.

The controller may be configured to handle on-vehicle "dif" file processing for all on-board modules which avoids additional cost and complexity of having each individual module handle dif files, or optionally while working within architectures already existing with the on-board modules or existing vehicle network architecture. The controller may: receive update instructions including target module or modules detail; receive the difference file software update; manage an upload of the existing full module file from the on-board target; manage the software file merge based on the difference file and the uploaded current version then pushes the update back to the target module or modules; inform or ask for authorization to proceed (if needed) from the vehicle operator; and/or confirm the update(s) were completed correctly and confirms to the offboard system and the vehicle operator. Optionally, the controller can be included as an additional on board networked module or virtualized with an existing module.

One non-limiting aspect of the present invention relates to the controller including a configurable on-board data logger to help capture and resolve intermittent vehicle problems through advanced diagnostics, optionally with capabilities sufficient to support for driver interface/GUI and driver/operator acknowledgement as needed. The controller may include configurable conditions for software update actions, for example: drive history, gear state, voltage, speed, time of day; software update robustness; retries, network message timing, delays; module software recovery strategies; vehicle battery power management; security—software based, hardware based; full traceability with extensive digital log files for complete vehicle and module confirmation and/or encryption. The controller may facilitate various updates, including firmware, bootloader, application software, calibrations, configurations, applications, etc.

One non-limiting aspect of present invention contemplates facilitating correction or update of a vehicle's radio and instrument cluster, for example, where the software is fixed through a coordinated software update. The present invention contemplates a computer being configured to compare an existing software set to the "fixed" software and/or an engineer performing assessment to create "dif files" that may then be saved in a database. The "dif files" and updating instructions associate with facilitating the contemplated "fix" maybe sent through the Internet or other computing Cloud to the vPUMA in the vehicle. The controller may "catch" the "dif" files and then upload the "full file" from the on-board radio and cluster. The controller then merges each dif file and their full file, creates new "full" files and sends them back to the radio and cluster for install. The radio and cluster may both confirm they were updated successfully back to the controller. The controller may then send a "success" messages back through Cloud to the Server. The controller helps OEMs deliver better vehicles faster. The controller may bring OTA software updates to OEMs at a much lower cost and/or enable faster time to market for a vastly improved customer experience.

Instead of hearing that sound when a vehicle fails to properly start, the present invention contemplates alerts, optionally through a voice or verbal communication system, being generated to warn of potential vehicle problems before they become problems. The controller may be configured to facilitate turning unfortunate and mostly unnecessary "reactive" automotive problems into corrective actions. The controller may be configured to wirelessly generate alerts for receipt at various types of user devices and through various communication mediums including those associated with Smart Phone notifications and alerts. The controller may be used to enable secure and efficient advanced diagnostics and prognostics, optionally as an additional on board networked module or virtualized in an existing module. The controller may be configured a program to include physics modeling, complimented with real world data (like outside temperature for example), which can optionally be continuously updated or monitored, to facilitate diagnosing and/or predicting the probability of a vehicle start. In the event of a potential flat tire situation, for example when a driver comes home from work and runs over a nail and the tire begins to lose air slowly and eventually that evening the tire goes flat and to be discovered being flat tire next morning, the controller can selectively communicate with key vehicle systems, even when the vehicle is turned off. It can send a message to the driver that the tire is going flat. The Cloud can even offer to send roadside assistance to fix the tire. The controller can provide drivers with "positive" outcomes to potential automobile problems, even when a driver is not in the vehicle.

One non-limiting aspect of the present invention contemplates implementing or facilitating implementation of the controller with the use of an on-board controller configured to facilitate wirelessly updating firmware stored within modules of a vehicle. The controller may be positioned within the vehicle and configured to interface signaling with the modules over a wireline bus, the controller configured to: receive an update for firmware stored within one of the modules, the update being wirelessly received from a server; receive a copy of the firmware currently stored within the one of the modules, the copy being received over the wireline bus from the one of the modules; and merge the update with the copy to create new firmware, the new firmware being suitable for use in adapting operation of the one of the modules according to the update.

Optionally, the controller may be configured to perform or otherwise facilitate the performance of one or more of the following: transmit the new firmware to the one of the modules over the wireline bus; to determine whether the one of the modules successfully installed the new firmware from an install message transmitted by the one of the modules over the wireline bus after compiling the new firmware; to wirelessly transmit a success message to the server to indicate whether the new firmware was successfully installed; facilitate the update using a difference file and/or significantly less code than the copy; to merge the update with the copy by assessing a portion of the copy associated with the update and thereafter replacing a corresponding portion of code with code included within the copy; to instruct the one of the modules to transmit the copy while at least one of the vehicle is shutdown and the one of the modules is non-essential; to facilitate storage of the new firmware within a non-volatile memory of the one of the modules; to be a standalone module connected directly to the wireline bus; and/or to be integrated into another one of the modules included within the vehicle, the controller relying on the another one of the modules to interface signaling with the wireline bus.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A controller comprising:
   an interface configured for communicatively interconnecting a module included within a vehicle with an exterior port of the vehicle, the module being configured to facilitate a vehicle related operation based at least in part on a first plurality of computer-readable instructions included at least partially within an old filed stored on a first memory, the module including a Universal Serial Bus (USB) loader to facilitate erasing and/or writing processes computer-readable instructions to the first memory;
   a processor configured to determine a new file to be stored within the first memory of the module in order to facilitate the vehicle related operation, the new file including a second plurality of computer-readable instructions different in at least content and/or form than the first plurality of computer-readable instructions;
   a second memory for storing the new file; and
   a relay included as part of the interface being configured for:
   i) communicatively connecting the module to the exterior port when in a first position; and
   ii) communicatively connecting the module to the second memory when in a second position;
   wherein the USB loader is configured to automatically obtain the new file stored on the second memory and to perform the erasing and/or writing processes necessary for replacing the old file stored on the first memory with the new file when the relay is in the second position, whereby the module thereafter facilitates the vehicle related operation at least based in part on the second plurality of computer-readable instructions.

2. The controller of claim 1 wherein the processor is configured to control the relay from the first position to the second position in response to receipt of a first command from a human-machine interface (HMI) included on the vehicle detecting a first update command from a vehicle occupant following display of a first update available message indicating a need to replace the old file with the new file.

3. The controller of claim 1 wherein the processor is configured to automatically control the relay from the second position back to the first position after the USB loader replaces the old file with the new file.

4. The controller of claim 1 wherein the processor is configured to maintain the relay in the second position, after the USB loader replaces the old file with the new file, for a period of time sufficient to perform diagnostics on the module when performing the vehicle related operation based at least in part on the second plurality of computer-readable instructions.

5. The controller of claim 4 wherein the processor is configured to:
   generate a copy of the old file for storage within the second memory prior to the USB loader beginning the erasing and/or writing processes necessary for replacing the old file with the new file and
   replace the new file stored within the first memory with the copy of the old file prior to returning the relay to the first position in the event the diagnostics indicate the module failing to properly execute the vehicle related operation based at least in part on the second plurality of computer-readable instructions.

6. The controller of claim 1 further comprising an antenna configured to wirelessly receive the new file for storage on the second memory and a Controller Area Network (CAN) port included as part of the interface to communicatively connect the exterior port and the module via a CAN of the vehicle.

7. The controller of claim 6 wherein the relay is configured to provide a wired interconnect between the exterior port and the module when in the first position and between the second memory and the module when in the second position.

8. The controller of claim 1 wherein:
   the first position prevents communication between the second memory and the module and interconnects a device connected to the exterior port with a network bus within the vehicle, the network bus being operable to facilitate communications with at least one additional module with the vehicle; and
   the second position prevents communication between the exterior port and the module, thereby causing the device when connected to the exterior port to be temporarily disabled from communicating via the network bus with the module while the relay is in the second position.

9. The controller of claim 1 wherein the processor is configured to automatically control the relay from the second position back to the first position after elapse of an update time, the update time corresponding with an amount of time needed for the USB loader to perform the operations necessary for replacing the old file stored on the first memory with the new file stored on the second memory.

10. The controller of claim 9 wherein the relay is configured to calculate the update time based at least in part on an amount of time associated with obtaining a permission for updating the module from a server located exterior of the vehicle.

11. The controller of claim 1 wherein the processor is configured to:
   determine the vehicle to be in a first state when vehicle diagnostics indicate conditions suitable to updating the old file, the first state requiring a capacity of a battery included within the vehicle to provide power for a period of time sufficient to enable the USB loader to perform the processes necessary for replacing the old file with the new file;

determine the vehicle to be in a second state when vehicle diagnostics indicate conditions unsuitable to updating the old file;

control the relay to the first position when the second state is determined; and control the relay to the second position in response to determining both of a need to update the old file and the first state.

12. The controller of claim 11 wherein the processor is configured for determining the period of time to include at least:
   a first length of time representative of time needed for the USB loader to replace the old file with the new file; and
   a second length of time proportional to a communication rate of a medium used to communicate the new file from the second memory to the USB loader.

13. The controller of claim 1 wherein the processor is configured to provide a permission to the USB loader in response to receipt of a wireless authorization received from a server outside of the vehicle, the USB loader requiring the permission prior to undertaking the processes necessary for replacing the old file with the new file.

14. The controller of claim 1 wherein the processor is configured to facilitate updating the old file with the new file by controlling the relay to the second position and without issuing instructions the USB loader to begin performing the operations necessary for replacing the old file with the new file.

15. The controller of claim 1 further comprising a logger configured to log performance of the erasing and/or writing processes necessary for replacing the old file with the new file.

16. A non-transitory computer-readable medium having a plurality of non-transitory instructions operable with a controller for updating a module having a Universal Serial Bus (USB) loader, the module being configured to facilitate an vehicle related operation based at least in part on a first plurality of computer-readable instructions included within an old file stored on a first memory, the plurality of non-transitory instructions being sufficient for:
   determining a new file to be stored within the first memory of the module in order to facilitate the vehicle related operation, the new file including a second plurality of computer-readable instructions different in at least content and/or form than the first plurality of computer-readable instructions;
   determining condition suitable for updating the module as a function of vehicle diagnostics; and
   controlling a relay from a first position to a second position for a period of time sufficient for the USB loader to perform operations necessary for replacing the old file with the new file, the second position disconnecting the USB loader from an exterior port of the vehicle and connecting the USB loader to a second memory of the controller having the new file, the USB loader thereafter performing operations for replacing the old file stored on the first memory with the new file stored on the second memory such that the module subsequently facilitates the vehicle related operation at least based in part on the second plurality of computer-readable instructions.

17. The non-transitory computer-readable medium of claim 16 wherein the plurality of computer-readable instructions are sufficient for:
   controlling the relay from the second position back to the first position after the USB loader performs the operations necessary for replacing the old file with the new filed, thereby communicatively disconnecting the module from the second memory and communicatively connecting the module to the exterior port while power remains supplied to the second memory.

18. The non-transitory computer-readable medium of claim 16 wherein the plurality of computer-readable instructions are sufficient for determining conditions suitable for updating the module when a capacity of a battery included in the vehicle is sufficient to power the controller and the module for a period of time at least equal to a first length of time representative of time needed for the USB loader to replace the old file with the new file plus a second length of time proportional to a communication rate of a medium used to communicate the new file from the second memory to the USB loader.

19. The non-transitory computer-readable medium of claim 18 wherein the plurality of computer-readable instructions are sufficient for determining the capacity for the period of time using a constant or estimated power consumption value representative of energy consumed per unit time while the USB loader performs the operations necessary for replacing the old file with the new file.

20. A system for updating a module within an vehicle comprising:
   wherein the module is configured to facilitate a vehicle related operation for a vehicle based at least in part on a first plurality of computer-readable instructions included within an old file stored on a first memory and the module is associated with a Universal Serial Bus (USB) loader capable of erasing and/or writing computer-readable instructions to the first memory;
   a server configured to facilitate wirelessly transmitting a new file having a second plurality of computer-readable instructions different in at least content and/or form than the first plurality of computer-readable instructions; and
   a controller having a computer-readable medium with a plurality of non-transitory instructions, which when executed with a processor, are sufficient to:
   i) wirelessly receive the new file from the server for storage within a second memory, establish a wired connection between the second memory and the USB loader to enable the USB loader to subsequently perform operations necessary to retrieve the new file from the second memory and thereafter replace the old file in the first memory with the new file, the controller establishing the wired connection by disconnecting the USB loader from an exterior USB port of the vehicle for a period of time greater than or equal to a first length of time representative of time needed for the USB loader to replace the old file with the new file plus a second length of time proportional to a communication rate of a medium used to communicate the new file from the second memory to the USB loader, the disconnecting of the USB loader from the exterior preventing communications between the exterior port and the module; and
   ii) re-connect the USB loader with the exterior USB port following expiration of the period of time, whereupon the USB loader is unable to communicate with the second memory via the wired connection.

* * * * *